Jan. 20, 1925.

H. ADELMANN 1,523,621

HAM BOILER

Filed Jan. 24, 1923

INVENTOR
Hans Adelmann
BY
ATTORNEY

Patented Jan. 20, 1925.

1,523,621

UNITED STATES PATENT OFFICE.

HANS ADELMANN, OF NEW YORK, N. Y., ASSIGNOR TO HAM BOILER CORPORATION, OF NEW YORK, N. Y., A CORPORATION OF NEW YORK.

HAM BOILER.

Application filed January 24, 1923. Serial No. 614,527.

*To all whom it may concern:*

Be it known that I, HANS ADELMANN, a citizen of the United States, residing at New York city, borough of the Bronx, in the county of Bronx and State of New York, have invented certain new and useful Improvements in Ham Boilers, of which the following is a specification.

This invention relates to ham boilers and has particular reference to that type of apparatus in which there is provided a receptacle or boiler proper with which co-operates a cover with means for locking the cover adjustably with respect to the receptacle and resiliently with respect to the ham being cooked within the receptacle. By the term ham, used herein for convenience, is to be understood any suitable piece of meat or the like that may be cooked and shaped within the receptacle.

Among the objects of this present improvement is to improve the construction of the cover with respect to the means for manipulating it downward toward or into the receptacle and for locking it in place.

Another object of the invention is the provision of a novel arrangement of resilient or false bottom attached permanently to the cover and removable therewith from the receptacle, said false bottom being intended for the provision of resiliency for the ham even though the cover may be locked in positive position.

With the foregoing and other objects in view the invention consists in the arrangement and combination of parts hereinafter described and claimed, and while the invention is not restricted to the exact details of construction disclosed and suggested herein, still for the purpose of illustrating a practical embodiment thereof reference is had to the accompanying drawings, in which like reference characters designate the same parts in the several views, and in which—

Figure 1:
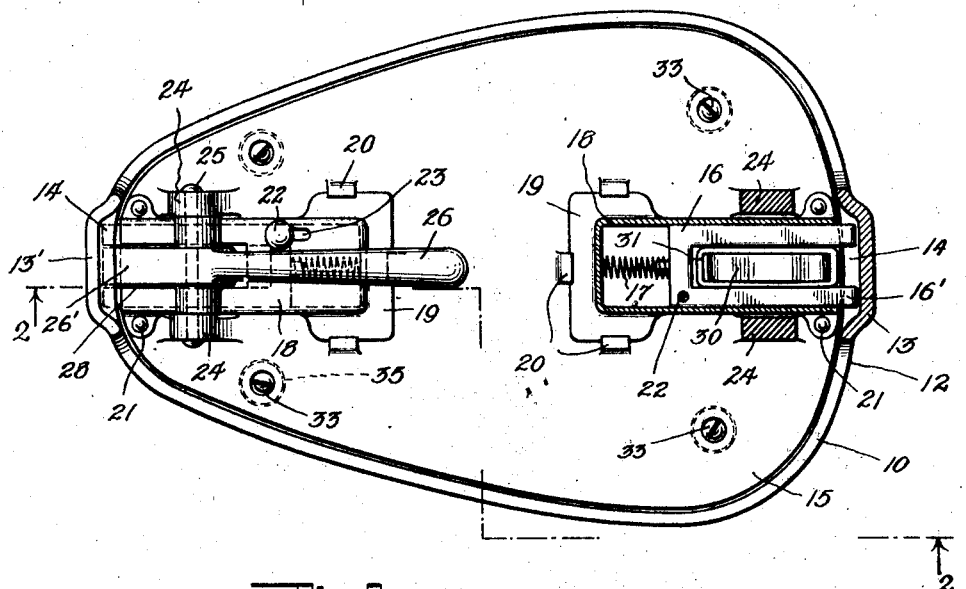
Figure 1 is a plan view of a preferred embodiment of the invention, parts being in section on the line 1—1 of Fig. 2.

Referring now more specifically to the drawings I shown a receptacle 10 as of oval form in plan view the same having a substantially flat bottom and approximately vertical side and end walls, the latter being shown at 11 and 12 as having outwardly flared portions or enlargements 13 each provided on its inner surface with a vertical series of teeth 14, the points of which lie practically in a vertical plane with the inner surface of the adjacent end wall. These projections 13 are carried upward preferably somewhat above the horizontal plane of the upper edge of the receptacle body, as shown at 13'. The structure of the receptacle for this reason is of unitary nature, having no movable parts and with hardly any means or members projecting materially on the outside of the receptacle. Thus provision is made for close nesting or packing of the receptacles which in my extensive experience sometimes are required to be used in large numbers in the ham making business. The oval form of the receptacle lends itself directly to the form in which hams are ordinarily made for cooking purposes after they are boned and for the moderate compression thereof during the cooking action and from which the meat may be sliced transversely, making true rectangular slices for sandwiches or the like.

Conforming to and movable within the receptacle is the rigid cover 15, which except as noted below is freely movable downward between the parts carrying the series of teeth or engaging members 14. Said engaging members or teeth are shown as having considerable length relatively transversely of the receptacle, and co-operating with each series is a bolt 16 of U-shape or having two spaced tongues or points 16' lying and movable on opposite sides of the longitudinal center of the apparatus. The effective width between the two points 16', co-operating with the long teeth 14, gives a tremendous strength to the device respecting tendency of the cover to twist or tilt around its longitudinal center in case the receptacle should be filled more firmly on one side than on the other when put under compression.

Each bolt is slidable lengthwise of the central plane of the construction toward or from a coil spring 17 located between the inner end of the bolt and the inner end of a casing 18 secured as shown to the top of the cover and held in place by the projection of the flange 19 thereof beneath a series of under cut lugs 20 formed preferably integral with the cover. The outer or remote end of the casing is finally secured to the cover as by rivets 21. The spring 17 urges the bolt outward, tending to keep the points 16' thereof in engagement or contact with the series of teeth 14. When the cover is inserted into the receptacle and forced downward either by hand or otherwise the bolts will snap in succession beneath the teeth as they are passed. The bolts, however, may be retracted from the teeth by the operation of finger pieces 22 movable along slots 23 formed in the tops of the casings 18.

One of the improved features of this invention is the provision of hand operated power devices for effecting maximum compression of the ham within the receptacle, the same serving also for use as handles for manipulation of the apparatus when filled or empty. On each side of each casing 18 and relatively close to the adjacent end of the cover are arranged two upright parallel standards 24, the upper ends of which are provided with aligned holes for the reception of a pivot bolt 25 fixed therein in stationary position, the axis of the bolt being transverse to the longitudinal axis of the cover.

Figure 2:
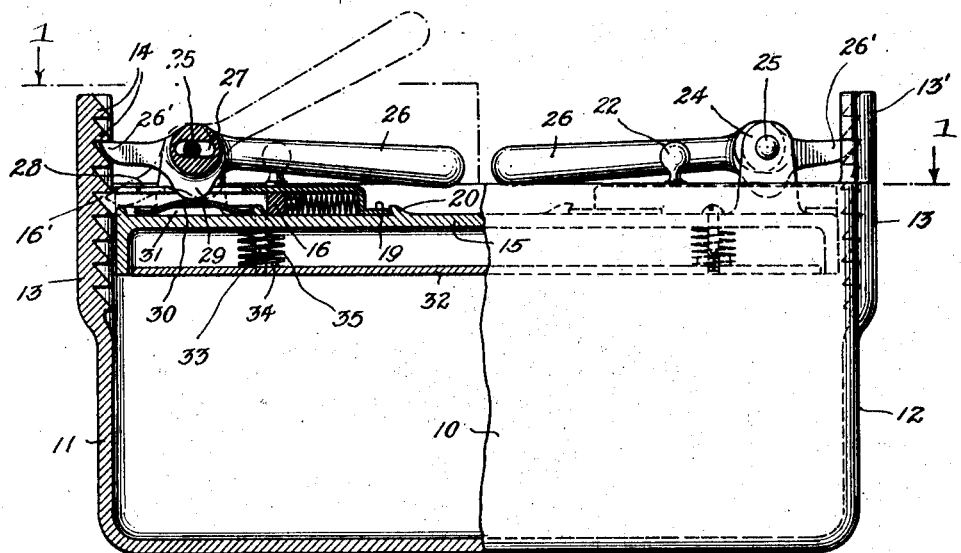
Fig. 2 is a partial side elevation and partial vertical section on the line 2—2 of Fig. 1.

Pivoted upon each bolt 25 is a handle or second class lever 26, the nose end 26' of which is shorter than the handle or power end and co-operates with the teeth 14. Any selected teeth 14 therefore may serve as the fulcrum when the nose 26' is caused to engage downward beneath the same as indicated in dot and dash lines, Fig. 2, so that when power is applied downward upon the handle the adjacent end of the cover will be forced downward powerfully. To accommodate the swinging movements of the handles each of them is preferably mounted loosely upon the bolt 25 through a slot 27. In other words, the operator grasping either handle and lifting the same and drawing the handle inward toward the center of the machine may cause the point thereof to engage downward beneath the same tooth 14 as is engaged by the bolt, and when the handle is forced downward the cover will be forced downward permitting the bolt to snap beneath the next succeeding tooth of the series and automatically holding the cover in whatever position it may be depressed to.

The top of each casing 18 is open or slotted at 28 adjacent to its outer end, and acting through said slot is a cam 29 formed on the bottom portion of the lever or handle 26. This cam co-operates with a leaf spring 30 held in a seat 31 formed in the top of the cover. The spring is bowed upward at its center and is so related to the cam that when the lever is depressed at its power end the crest of the cam will pass the dead center of the spring and so be self retained. Since the bolts act normally to lock the cover in rigid position within the receptacle either of the handles 26 may be grasped freely at any time for lifting and handling the entire structure, and after being so lifted the device may be set in any desired position and the handles then returned to lowered position as shown in full lines where they will be out of the way for nesting or packing purposes.

It being well known that hams or the like are subjected to a certain amount of swelling while cooking it is advisable to provide means to relieve the pressure on the meat incident to such swelling so as to prevent the expressing of valuable juices therefrom. To this end I provide a plate 32 connected on the inside of the cover and movable relatively upward thereto by means of a series of fasteners 33 shown in the form of screws passing freely through the cover and fixed in lugs 34 formed on the plate. A coil spring 35 surrounds each fastener and tends to resist the upward movement of the plate toward the cover, but when the ham is put under compression the springs go upward somewhat allowing the plate to approach the cover while the heads of the fasteners move upward from the cover.

I claim:

1. The combination with a receptacle having ratchet racks in its opposite walls and a cover movable downward between said walls, of levers co-operating with the racks for forcing the cover downward, and spring-pressed beveled latch bolts engaging the racks to lock the cover down, the fulcrums of said levers being mounted on the cover, and means co-operating therewith permitting longitudinal movement of the levers as well as pivotal movement thereof.

2. In a ham boiler, the combination of a receptacle, a cover movable downward into the same, said receptacle having a series of horizontally arranged engaging members, a lever including a cam extending downward, and a spring co-operating with said cam for automatically holding the lever in locked position relatively to the cover.

3. In a ham boiler, the combination of a receptacle, a cover movable downward into the same, said receptacle having a series of horizontally arranged engaging members, a lever including a cam extending downward, a spring co-operating with said cam for automatically holding the lever in locked position relatively to the cover, and means to engage automatically said engaging members for holding the cover depressed.

4. The combination as set forth in claim 1 in which the lever means is provided with a cam co-operating with a spring to automatically hold the power end of the lever depressed close to the central portion of the cover.

5. The combination with a receptacle having ratchet racks in its opposite walls and a cover movable downward between said walls, of U-shaped latch bolts mounted upon the cover and slidable relative thereto so that the tongues thereof will engage the racks to lock the cover down, and levers mounted upon the covers in central relation to said latch bolts so that the end of a lever adjacent to a rack may be depressed to enter between said tongues to engage said rack.

In testimony whereof I affix my signature.

HANS ADELMANN.